Figures 1, 2:
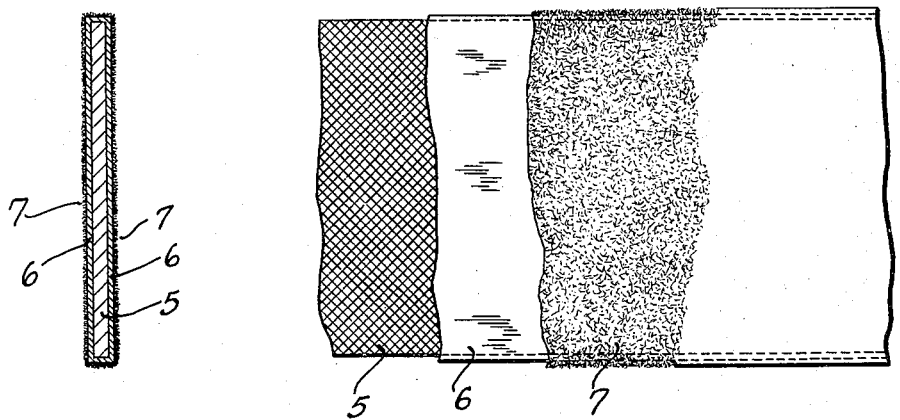

Jan. 14, 1941.  L. SPRARAGEN  2,228,735
ELASTIC SUEDE AND METHOD OF MAKING
Filed April 27, 1938

INVENTOR
Louis Spraragen
BY
Wooster & Davis
ATTORNEYS.

Patented Jan. 14, 1941

2,228,735

UNITED STATES PATENT OFFICE 2,228,735

ELASTIC SUEDE AND METHOD OF MAKING

Louis Spraragen, Bridgeport, Conn., assignor to Bridgeport Fabrics, Incorporated, Bridgeport, Conn., a corporation of Connecticut Application April 27, 1938, Serial No. 204,532

3 Claims. (Cl. 91—68)

This invention relates to an elastic suede and method of making it, and has for an object the making of a suede material which can be stretched and still retain its continuous suede surface and appearance.

With the foregoing and other objects in view, which will become apparent as the description proceeds, I have devised a suede material and method of making, an embodiment of which is illustrated in the accompanying drawing forming a part of this specification.

In this drawing:

Fig. 1 is a plan view of a strip or sheet of suede material constructed according to my improved method with portions broken away to more clearly show the construction; and Fig. 2 is a transverse section of the same.

The main object of the present invention is to provide a suede material which is elastic and therefore can be stretched under tension and will return to its original position when the strain is relieved, and also which will have a continuous suede surface and appearance both in the stretched and unstretched conditions. In making this material I take an elastic webbing or cloth or any elastic sheet 5 of any suitable material that stretches under tension and comes back to its original size or shape when the tension is removed, the usual material being cloth, live rubber or a combination of rubber and cloth, although probably the greater application will be on elastic webbing or cloth.

In carrying out the process, while the elastic web or sheet is in the normal or unstretched condition a coating or layer of compounded latex in a highly viscous condition is applied to this sheet, either to one or both sides depending on whether it is desired to have a suede appearance on one or both sides. By compounded latex is meant latex with highly elastic properties and including accelerators, vulcanizing ingredients, pigments, wetting agents, etc., an example of which is known on the market as "Heveatex", or similar compound, which can be applied and later vulcanized to produce a highly elastic and waterproof coating.

After this coating of compounded latex in the viscous condition has been applied to the unstretched elastic sheet it is then dried by means of suitable heaters. Then, before vulcanization, a second layer or coating of the compounded latex and of relatively low viscosity is applied on the first coating while the web or sheet is in the stretched condition. Immediately after the application of this second coat, or that is, before drying, and while the elastic sheet or web is still stretched a layer of flock or shearings, that is short loose fibers, are applied to this undried coat and it is held thereto by the sticky or tacky condition of the coating. This flock or shearings may be applied in various ways as for example by sifting it on, and blowing it on. This coating is then dried with the sheet in the stretched condition, and after drying it is vulcanized with the sheet or webbing in the normal or unstretched condition. The coating 6 and the loose fiber 7 may be applied to either one or both sides of the elastic material 5 as desired.

The above method is the preferred method or procedure as it gives the best quality of suede, but for cheaper grades the method may be somewhat modified. For example there may be only a single application of the compounded latex. This is preferably applied with the elastic sheet in the stretched condition, but not necessarily so. With this single application the compounded latex is preferably of a viscosity between that of the two coats of the preferred method as above described, that is, with the single coat it should be less viscous than the first coat of the preferred method and more viscous than the second coat. In this case the coating is not dried before the flock or shearings (loose cut fiber) is applied so that this fiber will effectively stick to the coating and be held thereby for the following operations. The flock or shearings is applied while the sheet is still in the stretched condition. After applying the flock or shearings the latex coating is dried and while the sheet is stretched. Then it is vulcanized while the sheet is in the normal or unstretched condition.

It will be seen from the above that the loose fibers of the flock or shearings will be more or less embedded in the latex coating and will be effectively held thereby, and as this is vulcanized it forms a waterproof elastic coating for the elastic base sheet which will stretch as this sheet is stretched, and will effectively hold the fiber so as to properly cover the surface and give the suede appearance in all conditions of the material either stretched or unstretched.

Having thus set forth the nature of my invention, what I claim is:

1. A method of making elastic suede which comprises covering an elastic sheet while in the unstretched condition with a coating of compounded latex in a highly viscous condition, drying the coating, then stretching the sheet and applying a second coating of compounded latex of relative low viscosity, applying a layer of flock or shearings to this second coating while the sheet is stretched, drying the coating with the sheet in the stretched condition, and then vulcanizing the coating with the sheet in the normal or unstretched condition.

2. A method of making elastic suede comprising applying to an elastic web while in the normal or unstretched condition a coating of compounded latex, drying, applying a second coating of compounded latex while the web is in the stretched condition, applying to this second coating while the web is still stretched a layer of short fibers, then drying the coating while the web is stretched, and vulcanizing with the web in the normal or unstretched condition.

3. A method of making elastic suede comprising applying to an elastic sheet while in the normal or unstretched condition a coating of compounded latex in a viscous condition, drying, then applying a second coating of the compounded latex while the sheet is in the stretched condition, applying to this second coating while undried a layer of short fibers and while the sheet is still stretched, drying while in the stretched condition, and then vulcanizing while the sheet is in the normal or unstretched condition.

LOUIS SPRARAGEN.